United States Patent Office 3,386,907
Patented June 4, 1968

3,386,907
ELECTRO-EROSIVE MACHINING APPARATUS
Ronald C. Abt, Cincinnati, Ohio, assignor to The Cincinnati Milling Machine Co., Cincinnati, Ohio, a corporation of Ohio
Filed Mar. 24, 1965, Ser. No. 442,287
6 Claims. (Cl. 204—224)

ABSTRACT OF THE DISCLOSURE

An electrochemical machining apparatus for producing holes extending completely through a workpiece. The work supporting structure or bolster includes an area directly in line with the hole to be produced that is adapted to support a center slug or trepanned cut-out. The bolster has a recess therein that is covered over by a rigid member that is yieldably supported so as to move into the recess when a sufficient force is applied against it. This rigid closure member supports the center slug or cut-out portion of the work during and after break-through of the tool.

---

The production of through holes in hardened workpieces is often desired and the electrical machining processes provide methods for producing these holes where the more conventional chip producing processes would be too slow or even completely unworkable. The electrical machining processes include spark machining in which high frequency electrical sparks are employed in a dielectric cutting fluid medium between the work and a tool electrode to dislodge small particles of the workpiece and electrochemical machining which is a rapid deplating process using high current densities in an electrolyte cutting fluid medium between the work and tool electrode. In the electrical machining processes for producing through holes, it is a common practice to supply the cutting fluid to the small space between the tool electrode and the work by pumping the fluid under pressure through passages in the electrode. The electrode then comprises a hollow member having an outer lip contour similar to the contour of the holes to be cut and further having one or more passages through its length opening outward from its leading end, which end is directed toward the workpiece and is maintained in close proximity thereto. Due to this configuration of the tool electrode, the electrical machining processes tend to leave a center slug in the hole or cavity produced and in through hole work, the electrode cuts through around this center slug, the initial breakthrough of the hole being at some spot on a small circumferential area around the center slug. In the electrochemical process in which the problem is most severe, the opening of the small hole through the workpiece disrupts the uniform flow of electrolyte out from the tool electrode. The uniformity of cutting action in the electrochemical machining process is dependent upon uniform flow of electrolyte and unless the flow of fluid out through the initial breakthrough opening is controlled, the cutting action suddenly becomes irregular and short circuiting may occur between the tool electrode and the work and this short circuiting produces rough surfaces and localized heating that can produce annealing of the hardened work in spots around the hole and destruction of the tool electrode. The exit side of the hole will also have burrs around its edges that are unsatisfactory and difficult to remove. In the spark discharge process, the interruption of smooth flow of the dielectric fluid can reuslt in the accumulation of swarf in spots which then can produce localized arcing and shorting between the tool electrode and work that will also result in inferior surface conditions around the exit edges of the hole. Since the tool electrode must pass completely through the workpiece in a through hole operation to produce a uniform hole size, the control of fluid flow at breakthrough is a difficult task. Moreover, the center slug is cut completely loose inside the electrode and being conductive, it can shift around to cause further shorting between the tool electrode and the work while the necessary overtravel of the tool electrode through the work takes place.

It is therefore an object of this invention to provide a work holding fixture for use in the electrical machining processes which will maintain a uniform flow of cutting fluid during and after breakthrough of the tool electrode.

It is also an object of this invention to provide a work holding fixture which will centrally support a center slug after it is cut free in an electrical machining, through hole process.

It is a further object of this invention to provide a work holding fixture that is useful time after time in an electrical machining operation without damage or deterioration during use in the production of through holes.

Yet another object of this invention is to provide a work holding fixture for electrical machining, particularly electro-chemical cutting, which enables the production of through holes having a burr-free exit edge.

In its preferred form, this invention is constructed from a conductive bolster or supporting member adapted to support a workpiece in a fixed location. In the area of the through hole to be produced in the workpiece supported on the bolster, a cavity is provided in the bolster which is covered by a hard, non-conductive slab. This slab has a regular surface exposed and adapted to bear against the workpiece at the hole location. The slab is yieldably supported in the cavity to bear against the workpiece by a resilient supporting means. Thus the fixture provides a yieldable surface behind the hole that maintains its regular surface contour without distortion as it yields.

A full understanding of the construction and operation of the fixture of this invention can be obtained from the following detailed description in which reference is made to the attached drawings wherein.

Figure 1:
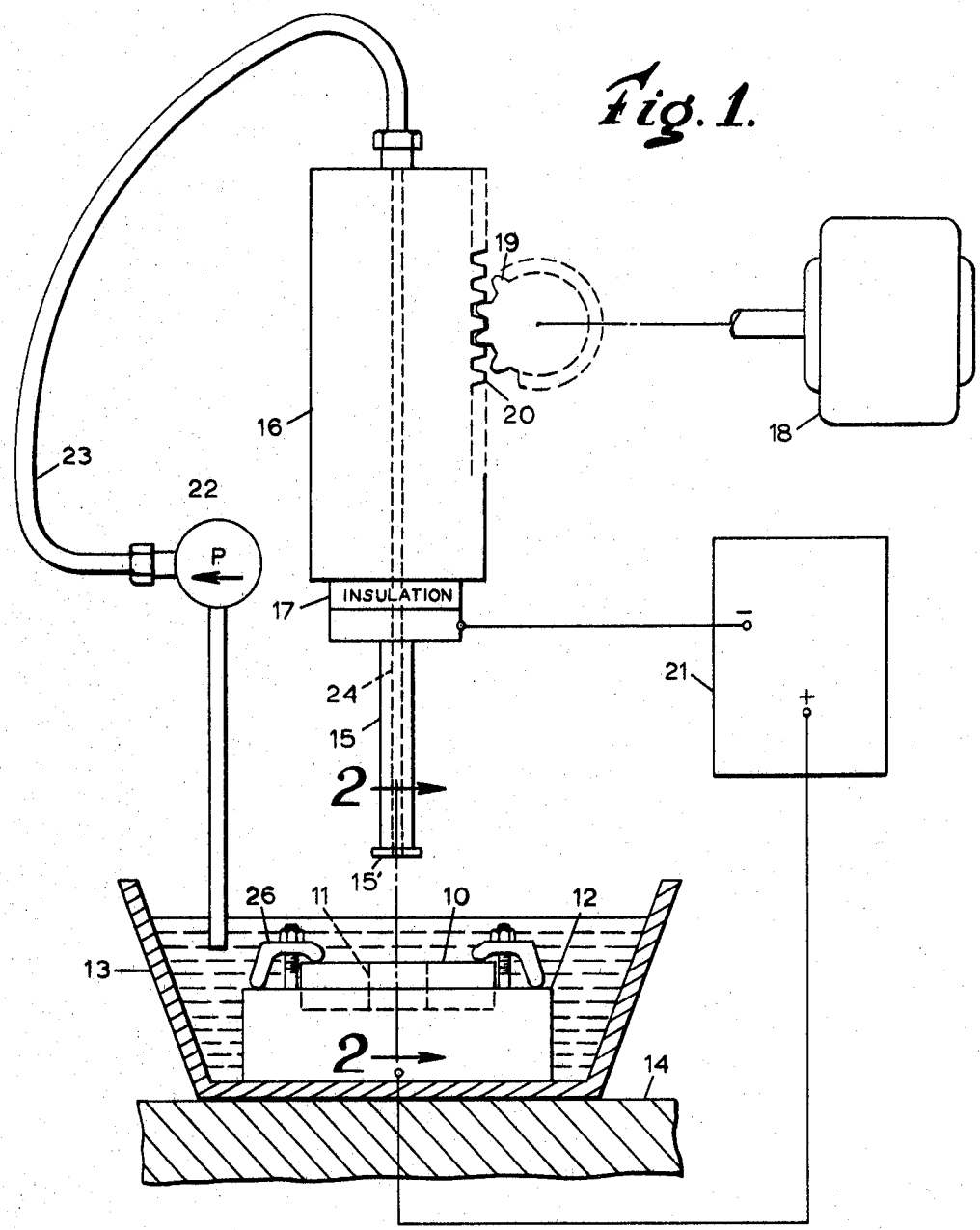
FIG. 1 is a diagrammatic showing of an electrical machining apparatus.

There is shown in FIG. 1 in simplified diagrammatic form a mechanism for performing electro-chemical machining or rapid deplating of a localized area of a workpiece 10 to form a hole 11 through from side to side. The workpiece 10 is supported in a fixture 12 and is immersed in an electrolyte solution that is contained in a tank 13 supported on the machine base 14. Machining of the hole 11 occurs by rapid deplating action as a tool electrode 15 is advanced toward and through the workpiece. The tool electrode 15 is supported on a quill 16 and electrically insulated therefrom by an insulated mounting block 17. The quill 16 is movable by means of a feed motor 18 that is connected to the quill 16 by means of a pinion 19 and a rack 20 formed along side of the quill. The motor 18 is operated at a rate that moves the tool electrode 15 through the workpiece 10 at a rate commensurate with the rate of metal removal therefrom in the machining process. The rate of metal removal is dependent upon the electrical current density that is produced between the tool electrode 15 and the workpiece 10 by the connection of a direct current power supply 21 across the two members. As shown, the tool electrode 15 is connected as the cathode and the workpiece 10 is connected as the anode through contact with the fixture 12 that is conductive, at least in part, and is in electrical circuit with the workpiece 10. The rate of metal removal is also dependent upon the supply of electrolyte in the space between the electrode 15 and workpiece 10 and to insure such a constant supply of relatively uncontaminated fluid, the electrolyte is circulated from the tank 13 through a pump 22 that forces it under pressure through tubing 23 connected with a passage 24 axially through the tool electrode 15 and opening out through the leading end 15' of the electrode 15. The apparatus described thus far is conventional in nature and its operation is well known to those skilled in the art. Therefore further detail of the process and equipment except for the detail of the fixture 12 will not be undertaken herein.

Figure 2:
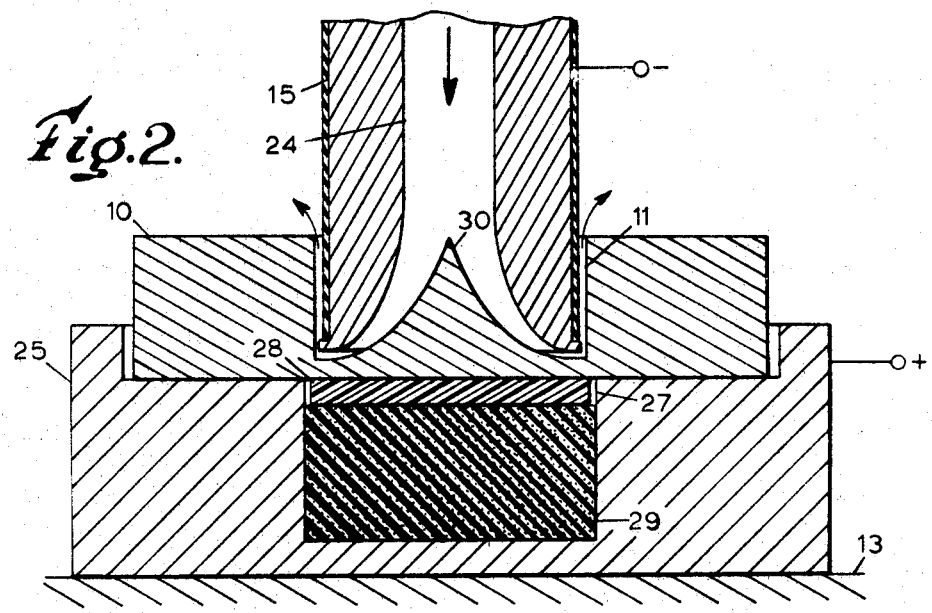
FIG. 2 is a sectional view of a part of the apparatus of FIG. 1 as viewed on line 2—2 thereof.

The fixture 12 is shown in cross section in FIG. 2. It is comprised of a bolster member 25 that is supported on the bottom of the tank 13. The bolster 25 is recessed as shown so that the workpiece 10 fits into it at a fixed location and clamps 26 (FIG. 1) are provided to hold the workpiece 10 firmly seated in the bolster 25. The bolster 25 is of conductive material and since the workpiece 10 is also conductive and held firmly against the bolster by the clamps 26, the workpiece is also anodic as is the bolster 25 which is connected to the positive terminal of the power supply 21. The bolster 25 has a recess 27 behind the workpiece 10 at the location of the hole 11 which is formed through the workpiece 10 during the machining process. The recess 27 has a slab 28 of hard insulating material, such as a hard plastic laminate, which loosely covers it. The slab 28 of insulating material is of a thickness less than the depth of the recess 27 and is yieldably supported across the recess 27 by a sponge rubber member 29 that fills the recess 27 behind the slab 28. The sponge rubber 29 functions to support the slab 28 across the recess 27 in position to contact against the workpiece 10 as shown in FIG. 2. It also allows the slab 28 to be moved into the recess 27 when pressure is applied against it.

Figure 3:
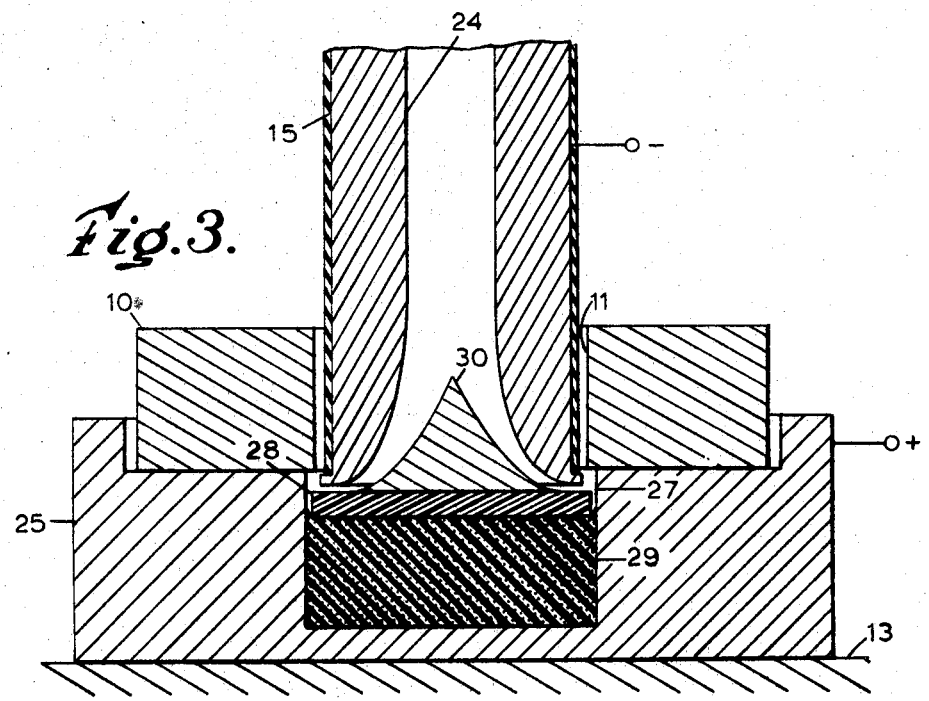
FIG. 3 is a view of the same section as shown in FIG. 2 but with the members thereof in altered relative positions.

During the electro-chemical machining process as it proceeds before the breakthrough of the hole 11 at the back side of the workpiece 10, FIG. 2, the flow of electrolyte through the passage 24 and out from the leading end of the electrode 15 is virtually uniform. The fluid is discharged from the electrode 15 and passes upward around the electrode 15 through the space between it and the workpiece 10 produced as a result of overcut, that is, the difference between hole size and electrode size which is a commonly known and understood feature of electrical machining. As shown, a center core 30 or slug of nearly conical shape is formed during the production of the hole 11 since the rate of metal erosion varies with the distance between the work 10 and electrode 15. Therefore when the hole 11 has been completed as in FIG. 3, the center slug 30 is still present although completely detached from the workpiece 10. During and the breakthrough of the hole 15, the center slug 30 is supported by the slab 28 and since the hydraulic forces produced by the electrolyte flow acting on the slug 30 are uniform, the slug does not tend to move in any direction other than down into the cavity 27. Also since the slab 28 retains its shape, there is no distortion of the surface supporting the slug which would cause it to tip or otherwise change its orientation or center position. Therefore the slug is maintained as in FIG. 3 in its central location with respect to the hole 15. This has the effect of maintaining a uniform flow of electrolyte from the electrode and prevents the slug 30 from acting to short the gap between the electrode 15 and workpiece 10 or bolster 25. In addition, since the movement of the slug 30 with the slab 28 into the recess 27 is dependent upon the pressure of fluid in the passage, the slab 28 will move away in advance of the electrode 15 as it is moved completely through the hole 11. The restriction to fluid flow out from the electrode will remain practically constant since the spacing between the electrode 15 and slab 28 will adjust itself and be maintained to keep the system forces in balance. The fluid flow will therefore remain practically constant and uniform as the tool electrode 15 is moved completely through the hole 11 and the hole size will be uniform end to end. The finish of the breakthrough side will be smooth and free of burrs both as a result of uniform electrolyte flow and absence of short circuits and arcs.

While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:

1. A fixture for supporting a workpiece in which a through hole is formed by an electrical machining operation, the fixture comprising:
   (a) a conductive bolster member adapted to support the workpiece in a fixed position thereon and having a recessed area behind the workpiece at the area of the through hole,
   (b) a slab of hard, electrically insulating material received in said recessed area and having a thickness less than the depth of said bolster member recess, and
   (c) means for yieldably supporting said slab across said bolster member recess and in position to contact the workpiece.

2. A fixture for supporting a workpiece in which a through hole is formed by an electrical machining operation, the fixture comprising:
   (a) a conductive bolster member adapted to support the workpiece in a fixed position thereon and having a recessed area behind the workpiece at the area of the through hole,
   (b) a slab of hard, electrically insulating material received in said recessed area and having a thickness less than the depth of said bolster member recess, and
   (c) a foam rubber pad in said bolster member recess adapted to support said slab yieldably in position to contact the workpiece and to permit said slab to shift into said bolster member recess when said slab is subjected to forces acting toward said bolster member.

3. Electrical machining apparatus for producing through holes in a conductive workpiece comprising in combination:
   (a) a conductive tool electrode having a fluid passage therethrough opening outward from the leading end thereof,
   (b) a bolster member adapted to support the workpiece in a fixed position and in electrical circuit therewith, said bolster member having a recessed area behind the workpiece,
   (c) a slab of hard insulating material received in said bolster member recess and having a thickness less than the depth of said bolster member recess,
   (d) means for yieldably supporting said slab across said bolster member recess and in position to contact against the workpiece,
   (e) means for producing an electrical potential difference between said tool electrode and the workpiece,
   (f) means for relatively moving said tool electrode at a controlled rate through the workpiece on said bolster member and into said recess thereof, and
   (g) means for producing a flow of electrical machining fluid under pressure through said tool electrode passage and out from the leading end thereof, said flow producing a force on said slab when said tool electrode is passed through the workpiece to cause said slab to move into said recess in advance of said tool electrode.

4. Electrical machining apparatus for producing through holes in a conductive workpiece comprising in combination:
   (a) a conductive tool electrode having a fluid passage therethrough opening outward from the leading end thereof, (b) a conductive bolster member adapted to support the workpiece in a fixed position and in electrical circuit therewith, said bolster member having a recessed area behind the workpiece, (c) a slab of hard insulating material received in said bolster member recess and having a thickness less than the depth of said bolster member recess, (d) a foam rubber pad in said bolster member recess adapted to support said slab yieldably in position to contact the workpiece and to permit said slab to shift into said bolster member recess when subjected to forces acting toward said bolster member, (e) means for producing an electrical potential difference between said tool electrode and said bolster member, (f) means for relatively moving said tool electrode at a controlled rate through the workpiece on said bolster member and into said recess thereof, and (g) means for producing a flow of electrical machining fluid under pressure through said tool electrode passage and out from the leading end thereof, said flow producing a force on said slab acting toward said bolster member when said tool electrode is passed through the workpiece to cause said slab to move into said workpiece in advance of said tool electrode.

5. An electrolytic machining apparatus for producing through holes in a conductive workpiece comprising in combination:

(a) a conductive tool electrode having a fluid passage therethrough opening outward from the leading end thereof, (b) a bolster member adapted to support the workpiece in a fixed position and having a recessed area behind said fixed position, (c) a slab of hard insulating material received in said bolster member recess and having a thickness less than the depth of said bolster member recess, (d) means for yieldably supporting said slab across said bolster member recess and in position to contact against the workpiece, (e) means for producing an electrical potential difference between said tool electrode and the workpiece, (f) means for relatively moving said tool electrode at a controlled rate through the workpiece on said bolster member, (g) means for producing a flow of a fluid electrolyte under pressure through said tool electrode passage and out from the leading end thereof, said flow producing electrolytic erosion of the workpiece when said tool electrode and workpiece are in close proximity and a force on said slab when said tool electrode is passed through the workpiece to cause said slab to move into said recess in advance of said tool electrode to maintain uniform a flow of electrolyte from said tool electrode.

6. An electrolytic machining apparatus for producing through holes in a conductive workpiece comprising in combination:

(a) a conductive tool electrode having a fluid passage therethrough opening outward from the leading end thereof, (b) a conductive bolster member adapted to support the workpiece in a fixed position and having a recessed area behind said fixed position, the workpiece and said bolster member being in electrically conductive contact, (c) a slab of hard insulating material received in said bolster member recess and having a thickness less than the depth of said bolster member recess, (d) a foam rubber pad in said bolster member recess adapted to support said slab yieldably in position to contact the workpiece and to permit said slab to shift into said bolster member recess when subjected to forces acting toward said bolster member, (e) means for producing an electrical potential difference between said tool electrode and said bolster member, (f) means for producing a flow of fluid electrolyte under pressure through said tool electrode passage and out from the leading end thereof, said flow producing electrolytic erosion of the workpiece when said tool electrode and workpiece are in close proximity and a force on said slab when said tool electrode is passed through the workpiece to cause said slab to move into said recess in advance of said tool electrode to maintain a uniform flow of electrolyte from said tool electrode, and (g) means for relatively moving said tool electrode at a controlled rate through the workpiece on said bolster member as the workpiece is eroded and into said bolster member recess.

References Cited

UNITED STATES PATENTS

| | | | |
|---|---|---|---|
| 3,330,754 | 7/1967 | Trager | 204—224 |
| 3,058,895 | 10/1962 | Williams | 204—224 |
| 3,257,306 | 6/1966 | Webb | 204—224 |

JOHN H. MACK, *Primary Examiner.*

HOWARD S. WILLIAMS, *Examiner.*

D. R. VALENTINE, *Assistant Examiner.*